Figure 1:
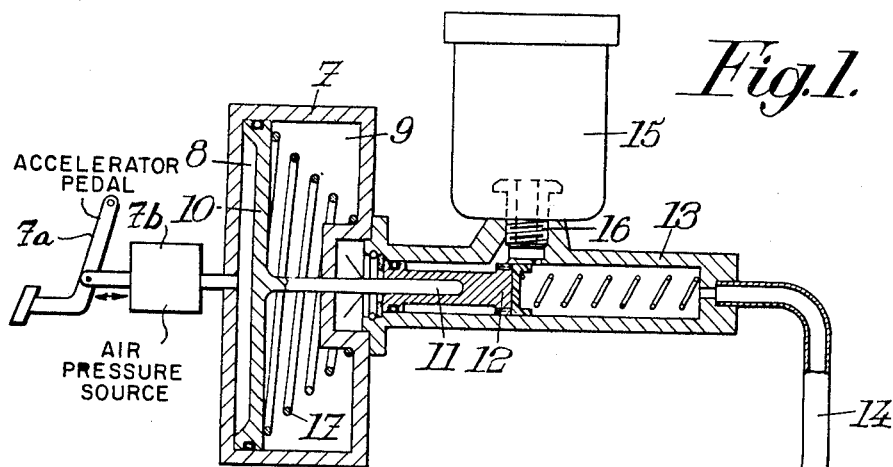

United States Patent [19]

Sertori

[11] 4,020,931

[45] May 3, 1977

[54] ACCELERATOR HYDRAULIC CONTROL MEANS FOR FRICTION BRAKES

[75] Inventor: Jean-Claude Sertori, Eaubonne, France

[73] Assignee: Labavia-S.G.E., Paris, France

[22] Filed: Feb. 4, 1975

[21] Appl. No.: 546,926

[30] Foreign Application Priority Data

Feb. 8, 1974 France .............. 74.04347

[52] U.S. Cl. .................. 192/3 TR; 188/345; 60/567

[51] Int. Cl.² ........................ B60K 21/00

[58] Field of Search ............ 192/3 TR, 3 S, 3 R

[56] References Cited

UNITED STATES PATENTS

| | | | |
|---|---|---|---|
| 1,817,416 | 8/1931 | Lippert | 192/3 TR |
| 2,626,026 | 1/1953 | Sherwood et al. | 192/3 TR |
| 2,881,879 | 4/1959 | Perrino | 192/3 TR |
| 3,126,987 | 3/1964 | Stell et al. | 192/3 TR |
| 3,200,914 | 8/1965 | Downs et al. | 192/3 TR |

*Primary Examiner*—Benjamin W. Wyche
*Attorney, Agent, or Firm*—Stevens, Davis, Miller & Mosher

[57] ABSTRACT

A vehicle hydraulic braking installation includes a main master-cylinder 1 operated by the driver's brake pedal with or without servo-assistance and an additional master-cylinder 13 which is operated when the driver releases the accelerator pedal. The additional master-cylinder is connected to the braking circuit only through the main master-cylinder. As soon as the main master-cylinder begins to be operated, the main master-cylinder cuts off any communication between the additional master-cylinder and the braking circuit.

2 Claims, 3 Drawing Figures

ACCELERATOR HYDRAULIC CONTROL MEANS FOR FRICTION BRAKES

The invention relates to composite hydraulic control devices for automobile vehicle friction brakes, the devices comprising a first master-cylinder the piston of which is operated by the driver's foot pressing on a brake pedal, and a second master-cylinder which is independent of the first and of which the piston is controlled by some means other than the said pressure on a brake pedal, preferably by releasing or "relaxation" of the accelerator pedal, a means which will for this reason, and by way of non-limiting example, be referred to hereinafter as "relaxation means".

The invention is concerned more particularly, but not exclusively, to control devices of the kind in question which are installed in tourist coaches.

An object of the invention is to make these devices answer better to various practical requirements, particularly in that they may be adapted to very simply to existing simple braking installation, without substantial modification of the constituent circuits and elements of these installations and in particular without increasing the local bulk of the latter.

The composite control device in accordance with the invention are essentially characterized in that the outlet conduit of the second master-cylinder is exclusively connected to the first master-cylinder, the output orifice of which is directly connected to the hydraulic friction brake control circuit, the point of connection on the first master-cylinder of the said outlet conduit being disposed in a position on the first master-cylinder, such that any communication between the said conduit and the said output orifice of the first master-cylinder is suppressed in the direction from this orifice towards this conduit as soon as pressure is applied to the brake pedal.

In preferred embodiments, use is made of one or both of the following arrangements:

The connection of the outlet conduit of the second master-cylinder is arranged in the position normally used for connecting this first master-cylinder to a liquid supply reservoir, this reservoir being then replaced by this conduit.

The connection of the outlet conduit of the second master-cylinder to the first master-cylinder is effected by means of an additional chamber situated at the end of the first master-cyliner opposed to that which comprises the said output orifice, this chamber being closed, on the side of this first master-cylinder, by the rear end face of the piston of the first master-cylinder and being traversed in a sealing-tight manner by a push rod controlled by the brake pedal.

Other features, objects and advantages of the invention will become apparent from the following description given by way of example only, with reference to the accompanying drawings showing three embodiments.

Figure 2:
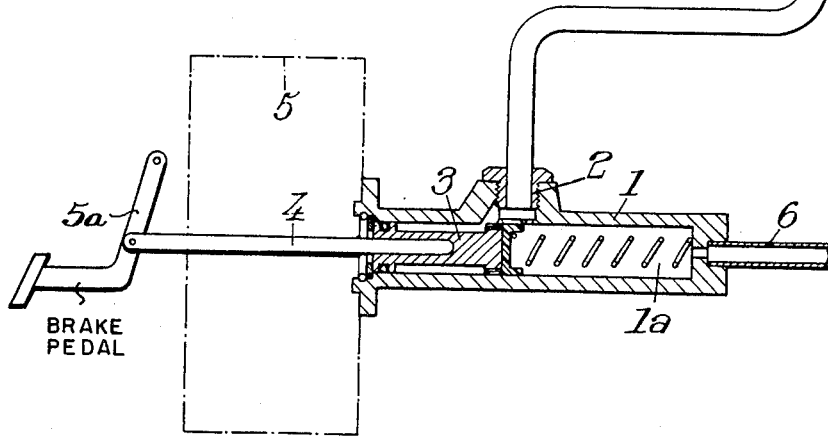
Figure 2:
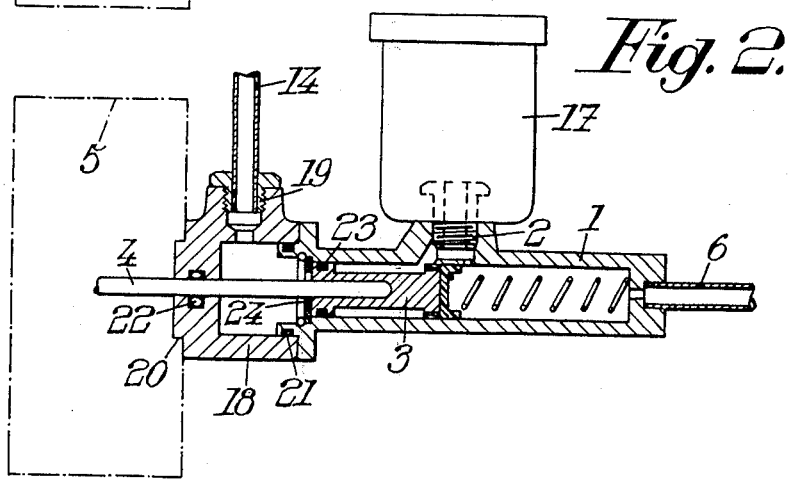
Figure 3:
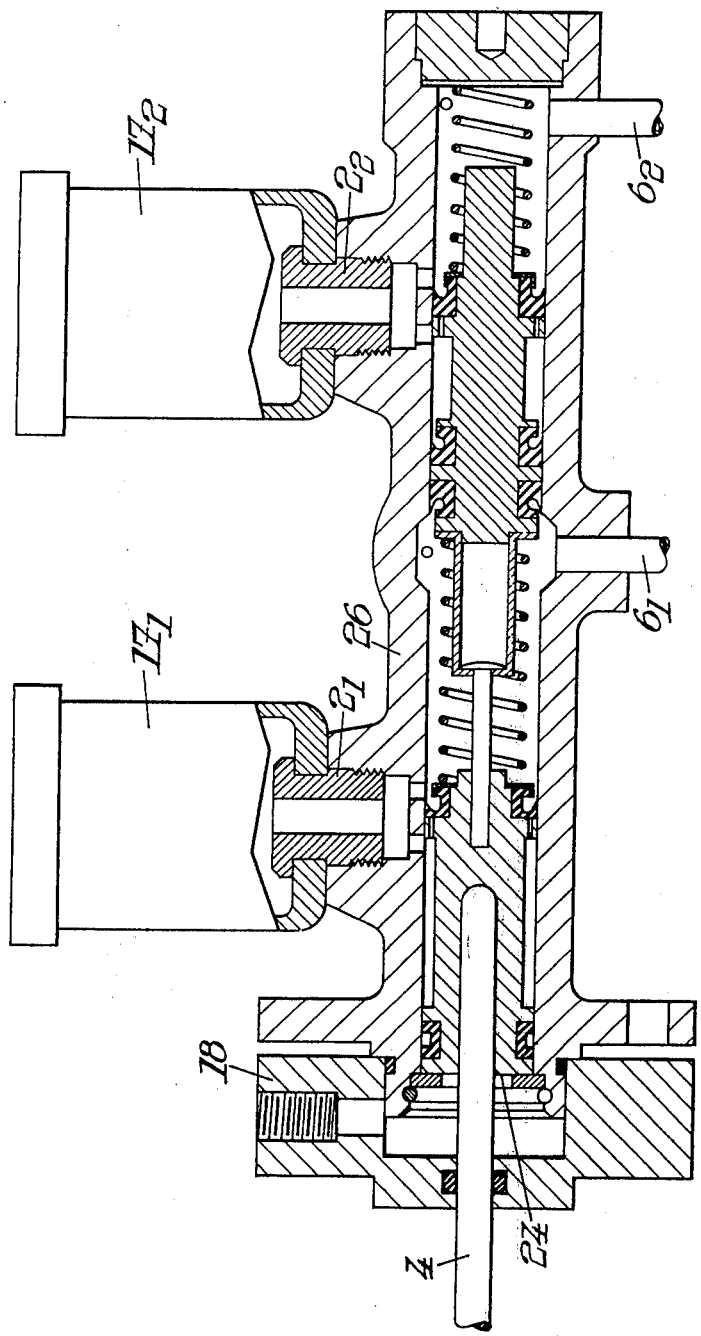

In the drawings:

FIG. 1 shows diagrammatically a composite braking installation in accordance with the invention, FIG. 2 shows diagrammatically a variant, also in accordance with the invention, of a portion of the installation shown in FIG. 1, and FIG. 3 shows diagrammatically in a larger scale another variant in accordance with the invention of a portion of a composite braking installation.

In each embodiment shown in the drawings, and in a known manner, the braking installation comprises a main or principal master-cylinder 1 supplied laterally at 2 with a liquid (generally oil) and containing a piston 3 connected by a linkage 4 — and if desired by a power-assisting mechanism of the "brake-servo" type 5 — to a brake pedal (5a).

On the end 1a of the master-cylinder 1 opposite the linkage 4 is connected an "outlet" conduit 6 connecting the master-cylinder to the hydraulically operated brakes in the usual manner, the brakes being generally mounted on the four wheels of an automobile vehicle.

The braking installation further comprises also in a manner known in itself, means permitting braking to be ensured by an additional control other than pressing the brake pedal, this control being preferably by release or relaxation of the accelerator pedal, 7a which controls air pressure source 7b, as has been assumed for simplicity in the following description, in a manner which is, of course, non-limiting.

These relaxation braking control means comprise:

A rigid casing 7 divided into two compartments 8 and 9 by a fluid tight movable or deformable partition 10 connected to a rod 1; means for keeping the pressures in the two compartments 8 and 9 equal so long as the relaxation control is not in operation and on the contrary for automatically reducing the relative pressure in the compartment 9 of the casing 7 disposed on the side of the rod 11, when this control comes into operation; and means for exploiting the sliding movement of the rod 11 resulting from modifications of this relative pressure, for the purposes of braking. Air pressure source 7b provides a pressure compartment 8 which is relative to the pressure in compartment 9 and which is, for example, may be atmospheric.

In known installations of the above kind, these exploitation means, which preferably apply a depression such as that which is obtained in the inlet pipe of the vehicle engine downstream of the butterfly valve when the butterfly valve is closed, are of two types indicated hereinafter by the A and B.

In a first type A, the casing 7 is directly mounted on the end of the master-cylinder 1 in such a manner as to be traversed by the linkage 4, the rod 11 then forming part of this linkage.

This solution presents certain advantages, but it requires considerable modification of the foot-braking installation (with or without power-assistance) and increases the bulk of this installation particularly in the direction of the brake pedal.

In the second type B, the casing 7 is separated from the principal master-cylinder 1, but it is mounted downstream of the latter, that is to say, in the outlet conduit 6 supplied with liquid by this master-cylinder.

In this solution, the rod 11 causes a piston 12 to slide in an additional master-cylinder 13 and the conduit 6 is connected to the friction brakes through the intermediary of this additional master-cylinder to which it is connected laterally, the braking forces generated respectively by the two pistons 3 and 12 in their respective master-cylinders being converted into cumulative displacements of liquid in the portion of the downstream conduit supplied by the additional master-cylinder.

This solution presents the following disadvantage:

During operation of the installation by pressure on the brake pedal, the high pressure generated in the operating liquid, a pressure currently reaching 100 atmospheres and generally much higher than that due to braking by relaxation is obtained not only in the principal master-cylinder 1 and the outlet conduit which connects it to the brakes, but also in the additional master-cylinder, this presenting delicate problems of sealing tightness, amongst others in the additional master-cylinder in the region of the piston, of which the sealing means must be specially designed to resist the high pressure in question.

Moreover, such an arrangement makes it necessary to mount a special valve in the said piston, a valve having the object of:

When the additional master-cylinder is operating alone, to prevent the liquid contained in the latter from being returned into the principal master-cylinder and its reservoir instead of into the conduit 6, When the two master-cylinders are simultaneously operated, to permit the passage of liquid from the principal master-cylinder through the piston of the additional master-cylinder and the said valve.

The solution proposed by the invention permits the disadvantages of both these two main solutions to be avoided at the same time.

In the solution in accordance with the invention, the additional master-cylinder 13 of solution B is used, with its piston 12 connected to the rod 11.

But here it is no longer the outlet of this additional master-cylinder, a conduit being indicated by the reference 14, which is connected to the friction brakes.

It is now the outlet conduit 6 of the principal master-cylinder 1 which is connected to the said brakes.

As for the conduit 14, it is itself connected into the principal master-cylinder 1 in such a manner that the displacements of the liquid which it contains give rise to corresponding displacements, generally of identical volumes, of the liquid contained in the conduit 6.

This latter conduit then serves as a common conduit which transmits the braking forces created by the two kinds of control that is to say foot and relaxation.

The solution of the invention avoids the disadvantage of solution A above since the independence of the casing 7 enables the latter to be positioned in any suitable place in the vehicle and in particular at some distance from the brake pedal and any power-assistance system, which avoids in particular the necessity of modifying the mechanism operated by the said pedal and of thus increasing the bulk.

The solution in question equally avoids the disadvantage of solution B above since the relatively high pressure generated in the control liquid by the foot brake is not transmitted to the additional master cylinder.

Clearly the pressure due to relaxation braking is itself transmitted to the principle master-cylinder, but this it not a disadvantage since this pressure is relatively small and lower than those due generally to foot braking.

As an indication, but of course by way entirely of illustrative example and in no way limiting of the invention, the radio between the maximum pressures capable of being obtained respectively in the additional and principal master-cylinders is generally less than 1:5, preferably lying between 1:10 and 1:7.

It is to be noted that a type of connection similar to that defined above for the two master-cylinders has already been envisaged for a braking installation for a towed trailer; but the additional master-cylinder of this installation was in no way provided to ensure controlled braking which is relatively light and renewable at will on the road as is that of the invention.

On the contrary, its role was to lock the trailer by intense braking which is automatically tripped on rupture of the connection between this trailer and its tractor, each operation of the said additional master-cylinder requiring special resetting when stationary.

In the preferred embodiment shown diagrammatically in FIG. 1, the connection of the conduit 14 to the master-cylinder 1 is effected by the fitting 2, the said conduit 14 then acting as a liquid reservoir generally connected into this fitting.

Also in FIG. 1 can be seen a liquid reservoir 15 supplying the additional master-cylinder 13, the reservoir 15 being connected into this latter by means of a fitting 16 and also a helical compression spring 17 disposed in the compartment 9 of the casing 7 and continuously urging the partition 10 towards the compartment 8. Further conventional elements (such as seals, springs and abutments) for the master-cylinders 1 and 13 are also shown but being conventional do not require further description here in detail. Thus, as is usual, the piston 3 advantageously carries a resilient seal in the form of a cup suitable for blocking or uncovering small passages formed in the head of this piston (and communicating with the fitting 2) in accordance with whether the piston moves towards the orifice 6 or in the opposite direction; moreover, the rest position of the piston 3 is such that the said cup seal just uncovers an opening in the cylinder 1 thereby providing communication between that and the fitting 2.

The operation of the above installation is as follows:

During foot braking, the linkage 4 and the piston 3 are forced into the master-cylinder 1 which drives liquid into the conduit 6.

The high pressure then exerted on this liquid is obtained uniquely in the said conduit 6 and in the end 1a of the master-cylinder 1 which is in communication with it; in particular this pressure is in no way transmitted to the fitting 2 and to the spaces connected to this fitting (conduit 14, master-cylinder 13) since the piston 3 with its accessories then blocks communication between the said fitting and the end 1a in question of the master-cylinder 1.

Release of the brake pedal results in inverse operations, under the action of the various return springs.

During the braking by relaxation, caused by simply releasing the accelerator pedal, the partition 10, the rod 11 and the piston 12 are forced in the direction in which liquid in the master-cylinder 13 is discharged into the conduit 14. An identical volume to the volume thus discharged is then driven through the fitting 2 into the master-cylinder 1 and, from there, into the conduit 6, which again causes braking.

As soon as the relaxation ceases, as a result of again depressing the accelerator pedal, the inverse operations will be observed, the volume of liquid mentioned above being automatically re-introduced into the master-cylinder 13.

At any instant foot braking may increase to and then exceed relaxation braking.

In contrast, in the embodiment of FIG. 1, the relaxation type of braking does not practically add its forces to foot braking when the latter has been initiated before hand, but this is not a draw-back since the first kind of braking is generally very small compared to the second kind and is only of interest in the absence of the second kind.

In the variant illustrated diagrammatically in FIG. 2, the connection of the conduit 14 into the master-cylinder 1 is no longer effected through the lateral fitting 2.

This fitting 2 is here connected in the usual manner to a liquid reservoir 17.

A chamber 18 is moreover interposed axially between the master-cylinder 1 and the structure which supports the brake pedal and/or its power-assistance mechanism, this chamber being traversed by the linkage 4 and the connection of the conduit 14 is effected through a lateral fitting 19 of this chamber.

Such a construction enables the two liquid circuits working respectively during foot braking and during relaxation braking to be isolated integrally, the first causing sliding movement of the piston 3 under the action of linkage 4 and the second causing the same sliding movements to take place by application of a larger or smaller volume of liquid against the end face of the piston 3, which is further from the conduit 6, that is to say its "rear" face 24 (if one considers that the master-cylinder is disposed "forwardly" of the brake pedal in relation to the direction of displacement of the vehicle, as is the general case).

In order to facilitate mounting of the chamber 18, there are advantageously provided on it cylindrical bearing surfaces projecting at 20 and recessed at 21 suitable to register with complimentary cylindrical bearing surfaces respectively on the structure supporting the brake pedal and on the master-cylinder 1.

The modification of a simple existing foot brake installation, necessary to transform this installation into a composite braking installation in accordance with the invention merely involves appropriate lengthening of the linkage 4 and positioning the chamber 18 by mutual engagement of the complimentary cylindrical bearing portions provided with appropriate sealing rings (22, 23), the different inter-engaged elements being then assembled together.

Each of the two solutions described above with reference to FIGS. 1 and 2 is perfectly suitable for double circuit braking installations.

In FIG. 3 is shown diagrammatically the case of such an installation comprising a double principal master-cylinder 26, installed exactly in accordance with the principal of FIG. 2 above; it is provided with two liquid reservoirs $17_1$ and $17_2$ connected respectively into two lateral fittings $2_1$ and $2_2$ of the master-cylinder 26 and suitable for supplying respectively two independent working conduits $6_1$ and $6_2$ through two mutually isolated chambers of the said master-cylinder 26, and a chamber 18 is mounted on the end of this master-cylinder, the chamber being supplied from a simple and single additional master-cylinder by a conduit of the type of the conduit 14 above.

There could also be envisaged a double additional master-cylinder of the kind of the double master-cylinder 26 of FIG. 3, supplying two independent conduits of the type of the conduit 14 above, these two independent conduits replacing respectively the two reservoirs $17_1$ and $17_2$ of FIG. 3 in the region of the fittings $2_1$ and $2_2$, as in the solution of FIG. 1, a case in which the end chamber 18 is omitted.

It will be appreciated by those skilled in the art that the invention is in no way limited to those of its embodiments which have been described above and that many apparently widely varying changes can be made without departing from the scope of the claims.

I claim:

1. A master-cylinder assembly for a vehicle braking system, comprising:
    a. a brake pedal;
    b. an accelerator pedal;
    c. a main master cylinder means, operated by said brake pedal, to create a braking hydraulic pressure, said main master cylinder means having a first outlet orifice directly connected to the braking system and a piston means;
    d. an additional master cylinder means, operated by said accelerator pedal on release of said accelerator pedal, to create a braking pressure which is smaller than the braking pressure created by said main master cylinder means, said additional master cylinder means having a second outlet orifice; and
    e. conduit means having one end connected to said second outlet orifice and another end connected to said main master cylinder means to communicate said second outlet orifice with said first outlet orifice, said conduit means at said another end connecting said second outlet orifice exclusively into said main master cylinder means at a position, adjacent said piston means, normally used for connecting a reservoir for working liquid into said main master cylinder means, wherein said another end is positioned with respect to said piston means such that when said main master cylinder means is not operated said second outlet orifice is in communication with said first outlet orifice and as soon as said main master cylinder means is operated said piston means blocks communication between said second outlet orifice and said first outlet orifice.

2. An assembly according to claim 1, in which the ratio of the maximum braking pressures in said additional master cylinder means and said main master cylinder means is from about 1:10 to about 1:5.

* * * * *